United States Patent
Lindauer et al.

(10) Patent No.: US 9,809,399 B1
(45) Date of Patent: Nov. 7, 2017

(54) AIR-DRIVEN CONTAINER TWISTING SYSTEM

(71) Applicant: Arrowhead Systems, Inc., Oshkosh, WI (US)

(72) Inventors: Cary Lindauer, Appleton, WI (US); David M. Walters, Oshkosh, WI (US); Michael S. Clark, Appleton, WI (US)

(73) Assignee: Arrowhead Systems, Inc., Oshkosh, WI (US)

( * ) Notice: Subject to any disclaimer, the term of this patent is extended or adjusted under 35 U.S.C. 154(b) by 0 days.

(21) Appl. No.: 15/183,307

(22) Filed: Jun. 15, 2016

Related U.S. Application Data

(60) Provisional application No. 62/180,323, filed on Jun. 16, 2015.

(51) Int. Cl.
*B65G 47/24* (2006.01)
*B65G 51/02* (2006.01)

(52) U.S. Cl.
CPC ...... *B65G 51/02* (2013.01); *B65G 2201/0235* (2013.01); *B65G 2201/0244* (2013.01); *B65G 2201/0252* (2013.01)

(58) Field of Classification Search
CPC ...... B65G 51/02; B65G 51/025; B65G 51/03; B65G 51/035
USPC ........................ 406/86, 87, 88; 198/416, 417
See application file for complete search history.

(56) References Cited

U.S. PATENT DOCUMENTS

| | | | | |
|---|---|---|---|---|
| 3,797,624 A | * | 3/1974 | Powell | B65G 11/183 193/25 R |
| 4,369,005 A | * | 1/1983 | Lenhart | B65G 51/03 406/88 |
| 4,458,801 A | | 7/1984 | Nichols | |
| 5,037,244 A | | 8/1991 | Newton | |
| 5,417,524 A | * | 5/1995 | Newton | B65G 51/03 406/191 |
| 5,609,237 A | * | 3/1997 | Lenhart | B65G 47/248 198/406 |
| 7,617,921 B2 | | 11/2009 | Workman et al. | |

OTHER PUBLICATIONS

Introducing the Entech Fabrications, Inc. "Gatling Gun" (TM) Container Infeed System, Entech Fabrications, Inc., WaybackMachine web archive page of http://entechfabrications.com/gatling.html, archival date Nov. 19, 2008.
"Tunnel Track", Sager Metal Strip Co., WaybackMachine web archive page of http://sagermetal.net:80/wordpress/?page_id=57, archival date Dec. 6, 2010.

\* cited by examiner

*Primary Examiner* — William R Harp
(74) *Attorney, Agent, or Firm* — Boyle Fredrickson, S.C.

(57) ABSTRACT

An air-driven container twisting system is configured for changing orientation of containers moving through a material-handling system. The air-driven container twisting system may include a container guide that extends through an air drive arrangement with the container guide configured to direct containers longitudinally while simultaneously rotating the containers while moving through the air-driven container twisting system without the need of declining elevation change and gravity assist.

16 Claims, 11 Drawing Sheets

AIR-DRIVEN CONTAINER TWISTING SYSTEM

CROSS-REFERENCE TO RELATED APPLICATION

This application claims priority from U.S. Provisional Patent Application No. 62/180,323, which was filed on Jun. 16, 2015, the subject matter of which is incorporated by reference in its entirety.

BACKGROUND OF THE INVENTION

1. Field of the Invention

This invention relates generally to material-handling systems. More particularly, the present invention is an air-driven container twisting system for changing orientation of containers moving through a material-handling system.

2. Discussion of the Related Art

Pneumatic or air-powered conveyors are sometimes used in material-handling systems. These implementations include high-speed material-handling systems that use air powered conveyors to move containers such as empty cans through the systems to different locations within a container filling and/or packaging facility. Since different procedures are performed to containers at different locations in the facility, it can be beneficial to have containers oriented in different ways at the different locations depending on the procedure being performed at particular locations. However mechanically reorienting containers with mechanically actuating reorienting devices takes time to actuate such devices, which tend to be complex and expensive. This presents challenges, especially in systems designed to move the containers continuously and at high-speeds, such as in pneumatic conveyance systems. Attempts have been made to reorient containers in pneumatic conveying systems without disrupting the continuous flow of the containers through the conveying systems, which typically implement steep downhill segments of guides that rotate the containers moving from elevating inlets to lower outlets with the assistance of gravity to overcome velocity losses from frictional drag on the guides while rotating. However, providing inlets and outlets at different heights within the conveying systems using gravity assist reorienting can present challenges for aligning upstream and downstream components of the material handling systems.

SUMMARY OF THE INVENTION

The present invention is directed to an air-driven container twisting system that does not require a declining elevation change for gravity assist in order to change orientation of containers moving through a material-handling system. This may be done with a rail twist fixture such as a track that guides and changes container orientation with air plenums surrounding the fixture directing a downstream air flow moving the containers through the fixture.

According to one aspect of the invention, an air-driven container twisting system is provided with inlet and outlet ends configured to respectively receive containers into and deliver containers out of the air-driven container twisting system.

An airflow chamber housing may be arranged between the inlet and outlet ends. An airflow chamber may be arranged within the airflow chamber housing and configured to direct an airflow within the airflow chamber housing. The airflow may flow in an airflow direction from the inlet end to the outlet end of the air-driven container twisting system. A container twist track may extend through the airflow chamber and be configured to direct the containers through the airflow chamber. Movement of the containers through the twist track may be driven by the airflow along a container travel path that extends longitudinally and helically through the airflow chamber.

According to another aspect of the invention, the airflow chamber housing includes multiple air plenums that are spaced from each other about an outer perimeter of the airflow chamber housing. Each of the multiple air plenums may be configured to direct an airflow into the airflow chamber. Multiple closure panels may be arranged between the multiple air plenums to provide alternating closure panels and air plenums of the airflow chamber housing. Each of the multiple air plenums may include a perforated inner wall with openings that face toward the container twist track.

According to another aspect invention, inlet and outlet end plates may be respectively arranged at the inlet and outlet ends of the air-driven container twisting system. At least one of the multiple air plenums may be hinge connected to both the inlet and outlet plates to allow the respective air plenum to move between open and closed positions to correspondingly allow and restrict access into the airflow chamber.

According to another aspect invention, an inlet assembly may be arranged at the inlet end of the air-driven container twisting system. The inlet assembly has an inlet passage that defines an inlet passage width and the airflow chamber defines an airflow chamber width that may be wider than the inlet passage width. The inlet passage width may be defined between a pair of inlet plenums at the inlet assembly and the airflow chamber width may be defined between a pair of air plenums arranged at opposite sides of the airflow chamber housing.

According to another aspect invention, an outlet assembly may be arranged at the outlet end of the air-driven container twisting system. The outlet assembly has an outlet passage that defines an outlet passage height and the airflow chamber defines an airflow chamber height that may be greater than the outlet passage height. The outlet passage height may be defined between a pair of outlet plenums at the outlet assembly and the airflow chamber height may be defined between a pair of air plenums arranged at top and bottom portions of the airflow chamber housing.

According to another aspect of the invention, a container transporting system is provided with a container guide arrangement and an air drive arrangement. The container guide arrangement has an upstream end and a downstream end and is configured to receive containers at the upstream end in a first orientation. The containers are discharged at the downstream end in a second orientation. The air drive arrangement extends along a majority of the length of the container guide arrangement and is positioned about the container guide arrangement. The air drive arrangement discharges air toward the container guide arrangement for advancing the containers from the upstream end of the container guide arrangement toward the downstream end.

According to another aspect invention, the container guide arrangement includes a container twist track that includes a series of helical rails. The container twist track and the air drive arrangement may be configured to direct air at pair of opposite end surfaces of each of the containers to advance each of the containers in a downstream direction. Air may also be directed onto side surfaces of each of the containers to provide an air cushion between the side surfaces of each of the containers and the rails.

According to another aspect invention, the air drive arrangement includes a plurality of generally tubular air plenums and/or an air cannon defining a tunnel through which the container twist track extends.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
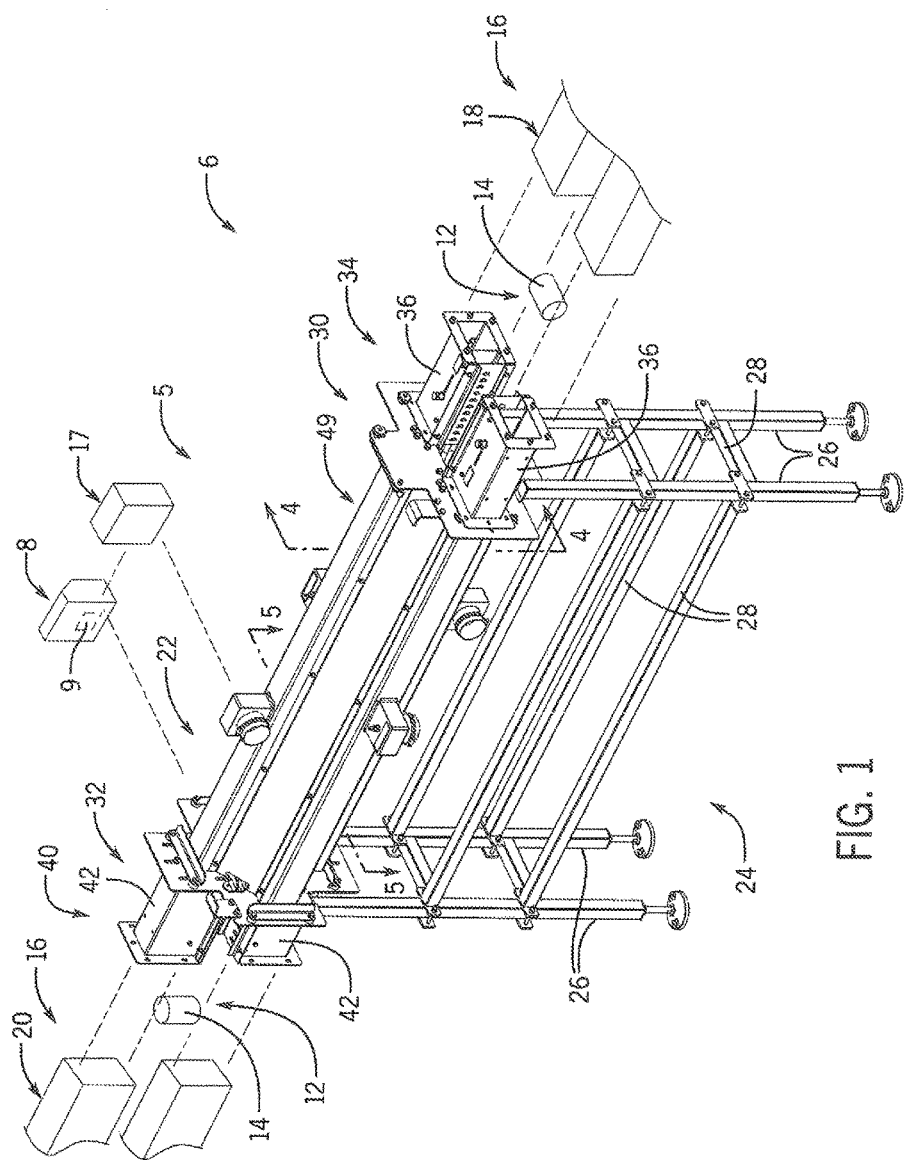
FIG. 1 is a partially schematic pictorial view of a material-handling system incorporating an air-driven container twisting system in accordance with the present invention.

Specific embodiments of the present invention will be described by the following non-limiting examples which will serve to illustrate various features of the invention. With reference to the drawing figures in which like reference numerals designate like parts throughout the disclosure, representative embodiments of the present invention provide a container transporting system that is shown as air-driven container twisting system(s) 5 in FIG. 1, shown used in a material-handling system 6. Air-driven container twisting system 5 is configured to reorient containers that travel at high speeds through the air-driven container twisting system 5, as explained in greater detail elsewhere herein. Material-handling system 6 includes a control system 8 that controls various components of the material-handling system 6. Control system 8 includes a user interface that allows a user to input commands or other information to the control system 8 and monitor system characteristics. A computer 9, which may be an industrial computer or, e.g., a programmable logic controller (PLC), includes circuitry with a processor that is configured to execute particular applications that operate in accordance with a computer software program that is stored in memory. Computer 9 receives data and/or signals from various sensors wirelessly or through conductors in the material-handling system 6 for evaluating and executing control decisions while controlling various electronic, pneumatic, and/or hydraulic components such as pumps, motors, solenoids, and various actuators for operation of the material-handling system 6.

Still referring to FIG. 1, material-handling system 6 is adapted to move articles, such as a series of containers, shown at 12, at high speeds through a production facility, which may be a container manufacturer, filling and/or packaging facility. Containers 12 are shown here as cans 14, although it is understood that containers 12 may have other configurations such as bottles or other containers or relatively light-weight articles that can be reoriented while traveling through air-driven container twisting system 5, as explained in greater detail elsewhere herein. Changing orientation of cans 14 may be done to better position the cans 14 in a particular way to allow fast movement around corners or to facilitate performance of various procedures at different locations within the facility such as rinsing, draining, filling, or the like.

Still referring to FIG. 1, material-handling system 6 includes conveyers 16 upstream and downstream of air-driven container twisting system 5. Conveyers 16 may be air conveyors that receive air from pneumatic system 17 that includes at least one air mover and suitable plumbing or other hardware for delivering pressured air to move cans 14. The air conveyors are shown here as horizontal air conveyor 18 which is configured to move cans 14 in a horizontal orientation and vertical air conveyor 20 which is configured to move cans 14 in a vertical orientation. It is understood that conveyers 16 need not be air conveyers, however, but may be belt or other conveyors.

Still referring to FIG. 1, air-driven container twisting system 5 includes a reorientation arrangement 22 that is supported by a frame 24. Frame 24 includes legs 26 and cross members 28 that interconnect the legs 26 to each other. Reorientation arrangement 22 is mounted on top of frame 24 and has inlet and outlet ends 30, 32, respectively. Air-driven container twisting system 5 is shown here with the reorientation arrangement 22 configured to receive cans 14 in a horizontal or sideways orientation into inlet end 30. Cans 14 are repositioned to a vertical orientation while moving through the reorientation arrangement 22 to exit the outlet end 32 in a vertical or upright orientation. It is understood that air-driven container twisting system 5 can be configured to instead reposition cans 14 from upright positions to sideways positions, or other amounts of repositioning and starting and ending orientations depending on the particular container repositioning needs of the material-handling system 6.

Figure 2:
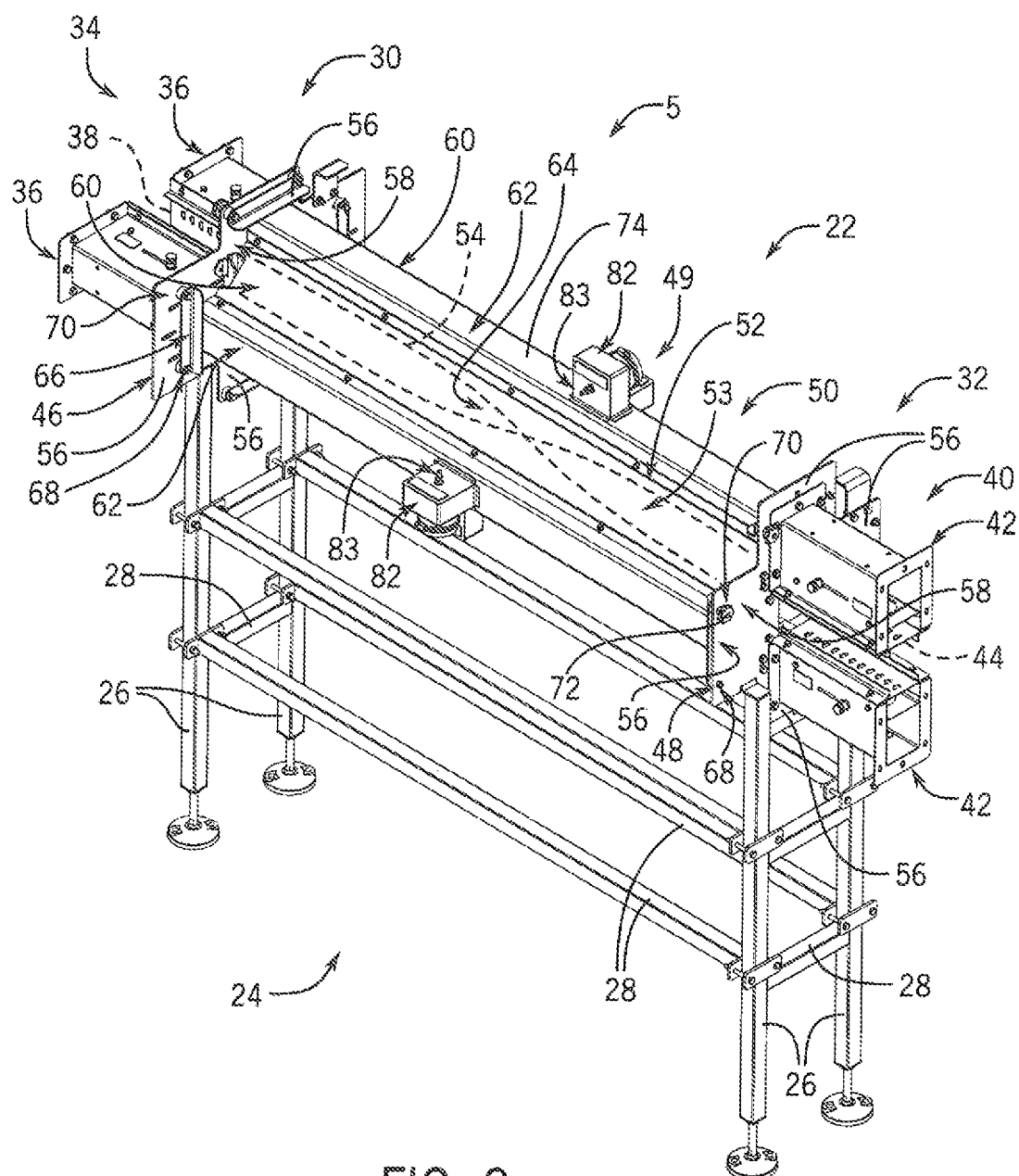
FIG. 2 is a pictorial view from an outlet end of the air-driven container twisting system of FIG. 1.

Referring now to FIG. 2 in conjunction with FIG. 1, inlet end 30 includes an inlet assembly 34 that is connected to and receives cans 14 (FIG. 1) from horizontal air conveyor 18 (FIG. 1). Inlet assembly 34 has a pair of spaced-apart inlet plenums 36, shown here horizontally aligned with each other and spaced to provide an inlet passage 38 through the inlet assembly 34. Cans 14 (FIG. 1) are pneumatically conveyed through the inlet passage 38 to pass in a horizontal orientation toward and into the reorientation arrangement 22. Outlet end 32 includes an outlet assembly 40 with a pair of spaced-apart outlet plenums 42, shown here vertically aligned with each other and spaced to provide an outlet passage 44 through the outlet assembly 40 along which the cans 14 (FIG. 1) are pneumatically conveyed to pass in a vertical orientation out of and away from the reorientation arrangement 22. Outlet assembly 40 is connected to and delivers cans 14 (FIG. 1) to the vertical air conveyor 20 (FIG. 1).

Still referring to FIGS. 1 and 2, reorientation arrangement 22 includes respective inlet and outlet plates 46, 48 to which inlet and outlet assemblies 34, 40 are respectively connected at opposite ends of the reorientation arrangement 22.

Inlet and outlet end plates 46, 48 define end boundaries of an air drive arrangement 49 that includes an airflow chamber housing 50 that encloses an airflow chamber 52 through which a container guide arrangement 53, shown here as container twist track 54, extends for changing orientation of cans 14 (FIG. 1) traveling through the air-driven container twisting system 5 as powered by an airflow of pressurized air provided by the pneumatic system 17 (FIG. 1). Each of the inlet and outlet end plates 46, 48 is generally planar and defines support segments 56 that support different segments of reorientation arrangement 22, with airflow chamber 52 arranged between the inlet and outlet and plates 46, 48 and surrounded on the outside by the enclosure of the airflow chamber housing 50. In this way, inlet and outlet end plates 46, 48 define end walls 58 of airflow chamber housing 50 with outer sidewalls 60 of the airflow chamber housing 50 defined by multiple alternatingly arranged air plenums 62 and closure panels 64 that collectively provide, as shown here, a polygonal tubular structure of the airflow chamber housing 50 about the airflow chamber 52.

Still referring to FIG. 2, each air plenum 62 has brackets 66 at its opposite ends that connect the air plenum 62 to support segments 56 of the respective inlet and outlet end plates 46, 48. Each bracket 66 is connected to the respective inlet or outlet end plate 46, 48 at a pivot joint 68 and a closure joint 70. Pivot joint 68 provides a hinge connection with a pivot pin about which air plenum 62 can pivot to an open position of the airflow chamber housing 50 that permits access into airflow chamber 52. Closure joint 70 includes hardware, shown here as thumbscrew 72, for securing air plenum 62 in a fixed position that corresponds to a closed position of the airflow chamber housing 50 that restricts access into airflow chamber 52, while providing a substantially closed tubular airflow directing conduit of the airflow chamber housing 50. FIG. 2 shows the airflow chamber housing 50 in its closed position. When the airflow chamber housing 50 is in its closed position, closure panels 64 extend between and interconnected respective adjacent pairs of the air plenums 62.

Figure 3:
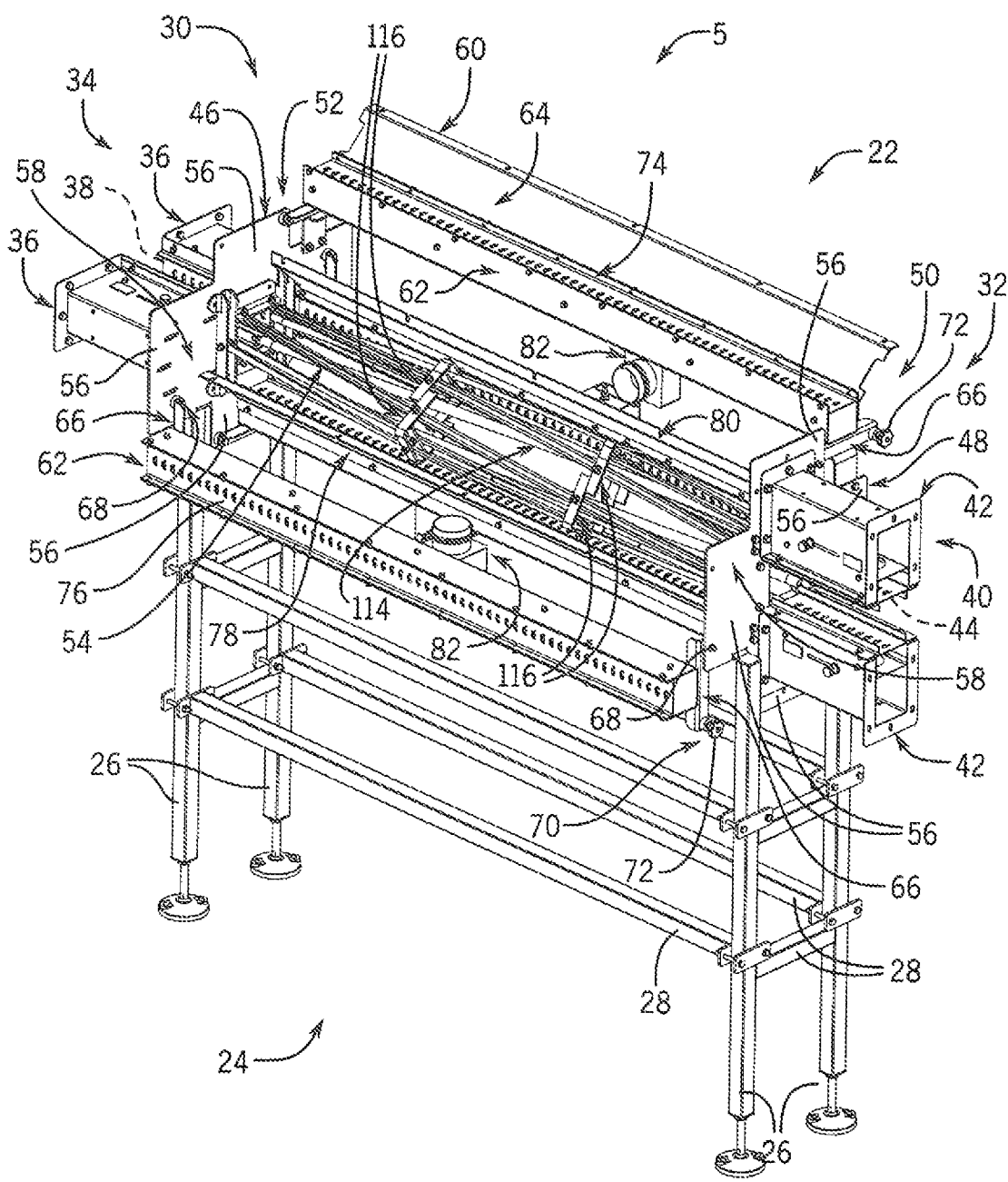
FIG. 3 is a pictorial view of the air-driven container twisting system of FIG. 1 with plenums pivoted open.

Referring now to FIG. 3, airflow chamber housing 50 is shown here in its open position. When the airflow chamber housing 50 is in its open position, closure panel(s) 64 is unconnected from one of its adjacent air plenums 62. Thumbscrew(s) 72 is loosened and released from its respective inlet or outlet and plate 46, 48 at the closure joint 70 (closed position in FIG. 2) and the air plenum(s) 62 is pivoted about the pivot joint 68 to expose the cavity of airflow chamber 52.

Still referring to FIG. 3, the multiple air plenums 62 include a top air plenum 74 (open position in FIG. 3), a right air plenum 76 (open position in FIG. 3), a bottom air plenum 78, and a left air plenum 80 that surround the container twist track 54. An air supply inlet 82 is connected to each of top air plenum 74, right air plenum 76, bottom air plenum 78, and left air plenum 80, with each air supply inlet 82 operably connected to receive pressurized air from pneumatic system 17 (FIG. 1). Each air supply inlet 82 has a manual air flow control damper 83 (FIG. 2) that is configured to selectively move a blocking device such as a valve blade for blocking or permitting airflow through an opening of the air supply inlet 82 for controlling airflow through the air supply inlet 82 and plenums 62. Each air plenum 74, 76, 78, 80 is in the form of a long, tubular member with interconnected outer walls 84 that collectively define a generally U-shaped channel with closed ends defined by end walls 58 and that extends throughout the length of airflow chamber housing 50.

Figure 4:
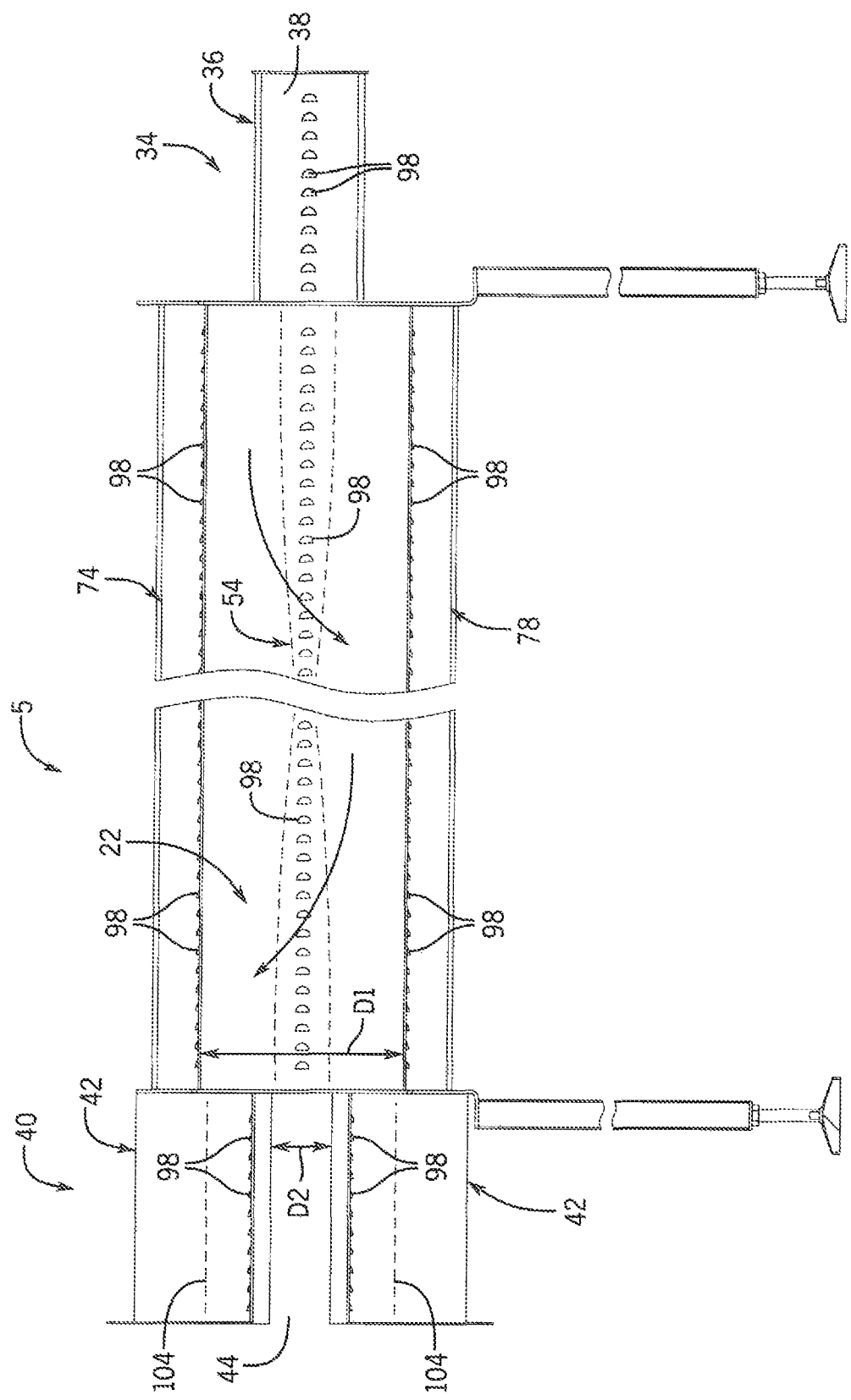
FIG. 4 is a side elevation cross-sectional view of the air-driven container twisting system taken at line 4-4 of FIG. 1.

Referring to FIG. 4, the top and bottom air plenums 74, 78 are transversely aligned with outlet plenums 42 of outlet assembly 40 and are spaced further apart from each other than the distance between the outlet plenums 42, shown as distances D1 and D2, respectively. The cavity of the airflow chamber 52 is correspondingly taller or greater than the height of the outlet passage 44, whereby an opening height reduction is defined at the outlet end plate 48 (FIG. 3) at the transition from the airflow chamber 52 (FIG. 3) of the airflow chamber housing 50 (FIG. 3) to the outlet passage 44 of the outlet assembly 40.

Figure 5:
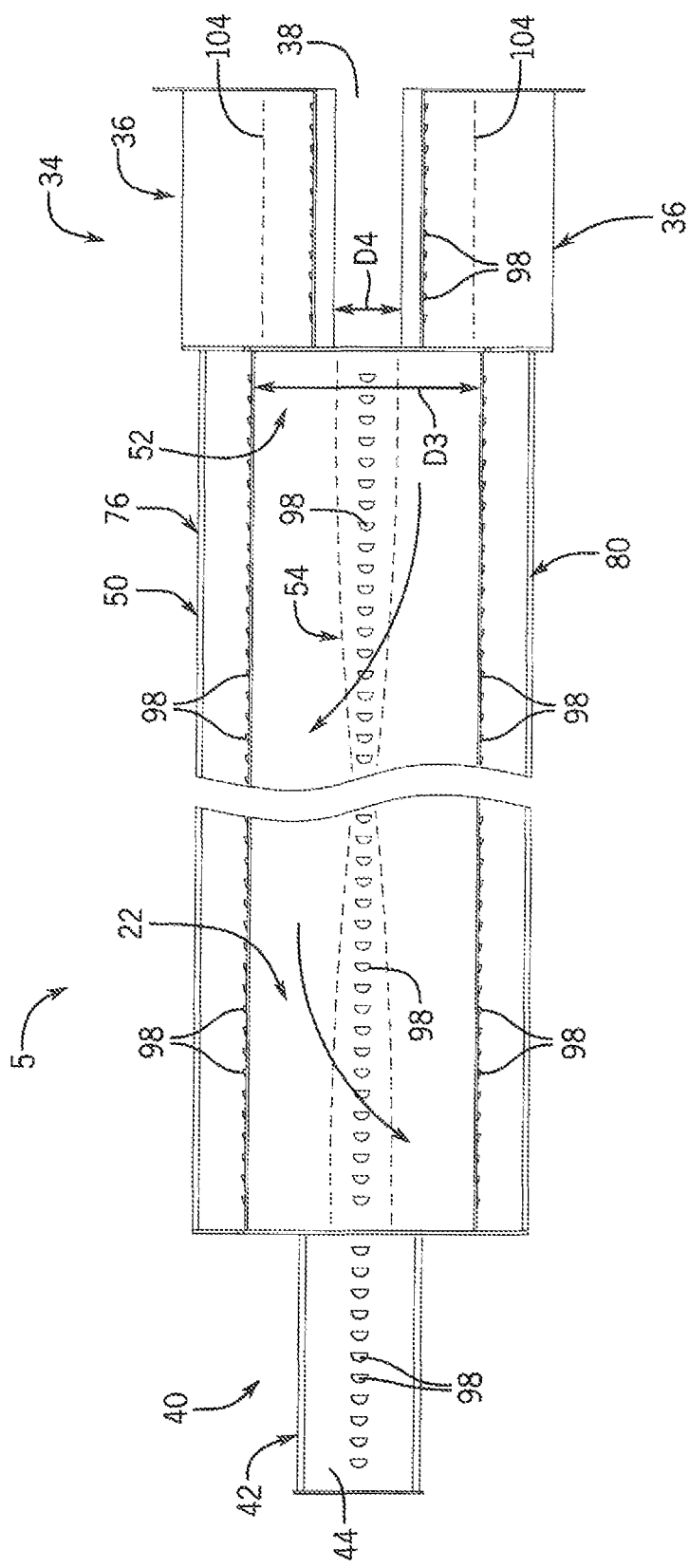
FIG. 5 is a top plan cross-sectional view of the air-driven container twisting system taken at line 5-5 of FIG. 1.

Referring to FIG. 5, the right and left air plenums 76, 80 are vertically aligned with inlet plenums 36 of inlet assembly 34 and are spaced further apart from each other than the distance between the inlet plenums 36, shown as distances D3 and D4, respectively. The cavity of the airflow chamber 52 is correspondingly wider or greater than the width of the inlet passage 38, whereby an opening width expansion is defined at the inlet end plate 46 (FIG. 3) at the transition from the inlet passage 38 of the inlet assembly 34 to the airflow chamber 52 of the airflow chamber housing 50.

Figure 6:
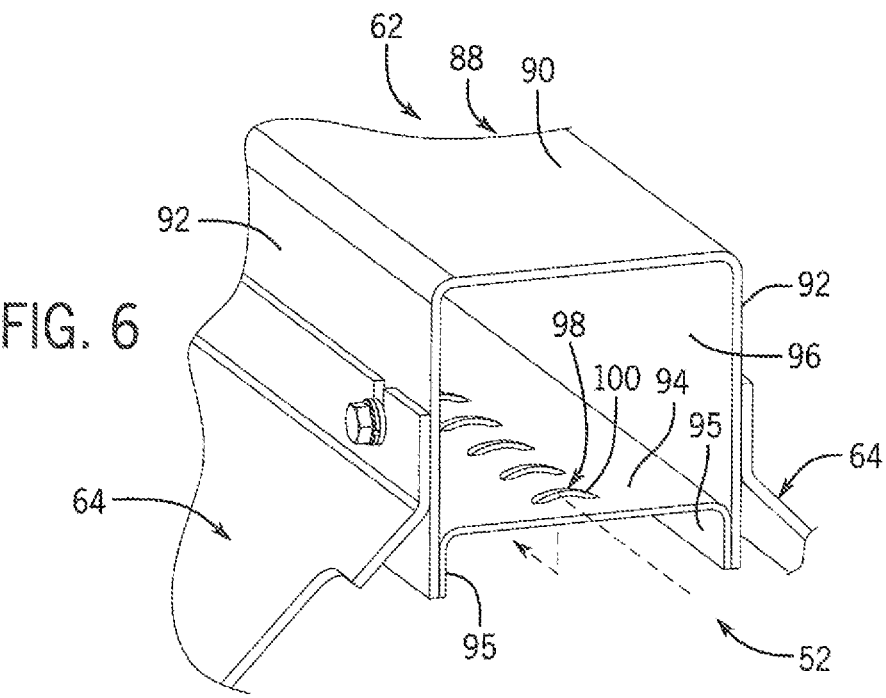
FIG. 6 is a pictorial view of a portion of a plenum incorporated in the air-driven container twisting system of FIG. 1.

Referring now to FIG. 6, each plenum 62 has a tubular plenum body 88 with an outer wall 90 and opposite side walls 92 that extend from outer wall 90 to define a C-shaped channel and a perforated bottom or inner wall 94. Perforated bottom or inner wall 94 closes the C shaped channel of the outer and side walls 90, 92 to provide the boxlike tubular configuration of plenum body 88 that surrounds an air distribution chamber 96, with side flanges 95 of perforated inner wall 94 nesting against inwardly facing surfaces of side walls 92. Air supply inlet 82 (FIG. 2) is connected to outer wall 90 and closure panels 64 are connected to the side walls 92 so that pressurized air delivered through air supply inlet 82 is delivered into air distribution chamber 96. Perforated inner wall 94 faces toward airflow chamber 52 and has perforations or openings shown as air louvers 98 that define generally D-shaped perimeters and curve upwardly into the air distribution chamber 96 to provide a slit-like opening through which pressurized air of the air distribution chamber 96 flows for delivery into the airflow chamber 52 while providing a directionality of the flow. This defines a flow direction of the airflow represented by the dashed arrow 102, in an upstream to downstream direction relative to the length of air-driven container twisting system 5 (FIG. 1).

Figure 7:
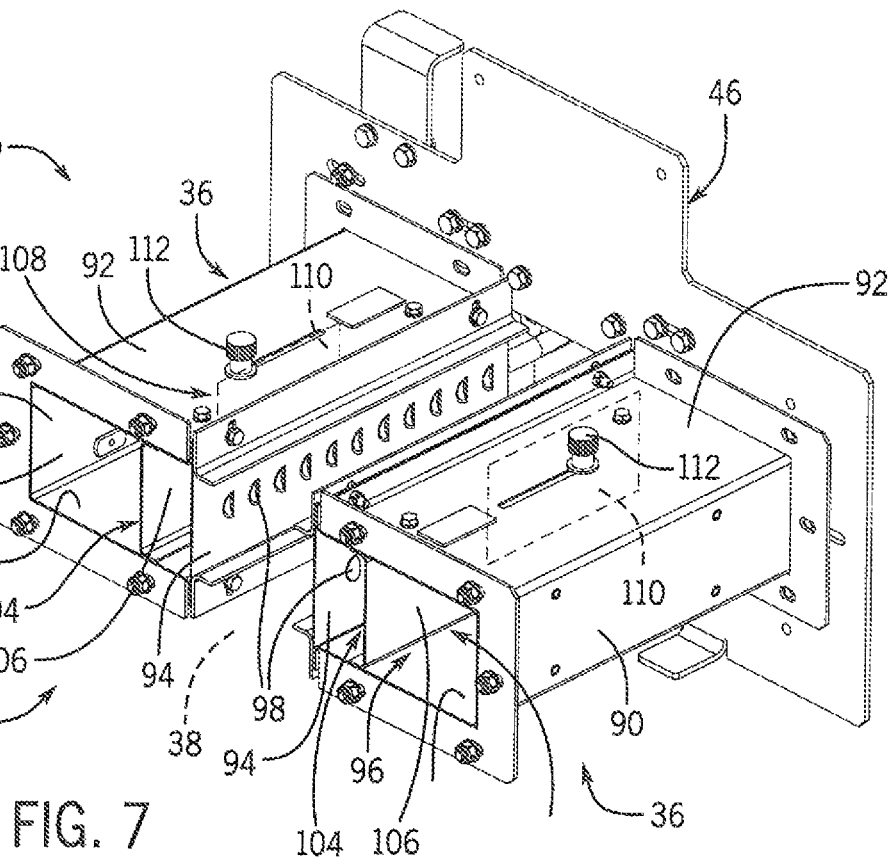
FIG. 7 is a pictorial view of a portion of an intake assembly incorporated in the air-driven container twisting system of FIG. 1.

Referring now to FIG. 7, inlet plenums 36 are substantially the same as plenum(s) 62 (FIG. 6) so the description of plenums 62 (FIG. 6) also applies to inlet plenums 36, only differing in the following ways. Inlet plenums 36 further include a separator wall 104 arranged in the air distribution chamber 96, parallel to the perforated inner wall 94. Separator wall 104 has a separator wall opening 106 that defines part of the shutoff mechanism 108 that includes a blocking plate 110 that can selectively slide relative to the separator wall opening 106 for blocking or permitting airflow through the separator wall opening 106. Knob 112 is shown here connected to blocking plate 110 to allow movement and position control of blocking plate 110 for controlling airflow through the air distribution chamber 96 and air louvers 98. Outlet plenums 42 are substantially the same as inlet plenums 36 so the description of plenums 62 and inlet plenums 36 also applies to outlet plenums 42 (FIG. 3).

Figure 8:
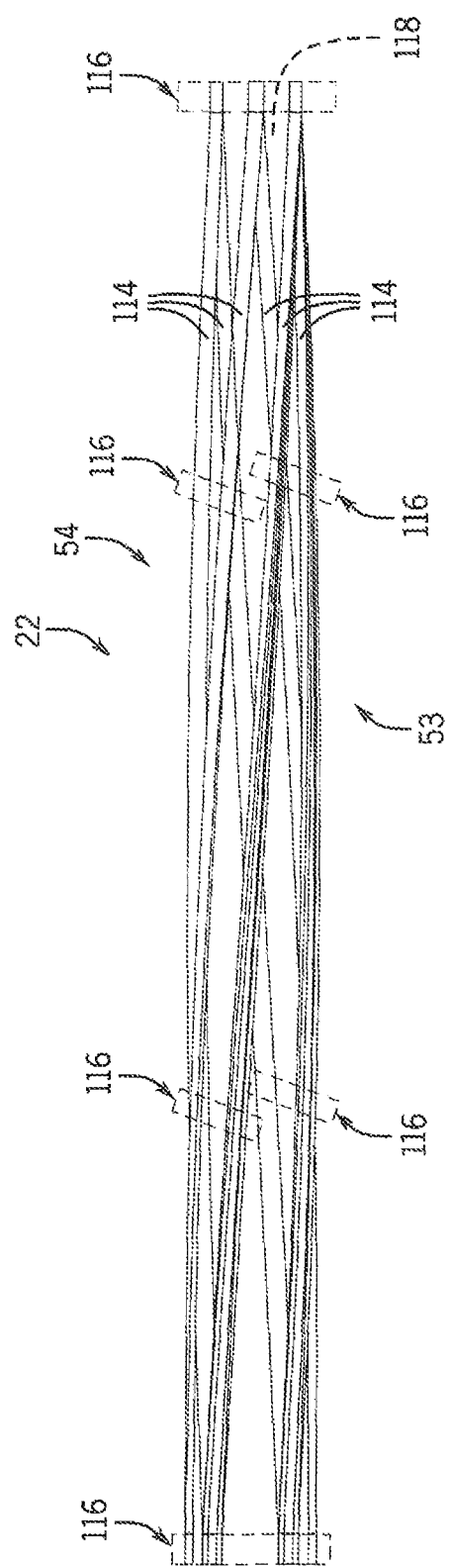
FIG. 8 is a top plan view of the twist track incorporated in the air-driven container twisting system of FIG. 1.

Referring now to FIGS. 3 and 8, container twist track 54 generally includes a series of longitudinally and helically extending guide rails 114 that are supported at axially spaced apart locations by a series of rail supports 116. The guide rails 114 and rail supports 116 are configured such that guide rails 114 define a passage 118 slightly larger in cross-section than the containers 12 (FIG. 1), such as cans 14 (FIG. 1), which are adapted to be transported through reorientation arrangement 22. The container twist track 54 is positioned at generally the same elevation at both inlet end 30 and outlet end 32, which simplifies installation and facilitates integration with the can or other container handling and conveyance equipment located upstream and downstream of air-driven container twisting system 5. In the embodiment illustrated in FIGS. 1-3, the container twist track 54 is configured to alter the orientation of the cans 14 (FIG. 1) from a generally horizontal orientation at inlet end 30 to a generally vertical orientation at outlet end 32. It is understood, however, that the container twist track 54 may also be configured to change the can orientation from vertical to horizontal, or between any other inlet and outlet orientation as desired. The guide rails 114 may be provided with polymeric or other low friction container contact surfaces to prevent the guide rails 114 from marring the surfaces of containers 12 (FIG. 1) as the containers 12 (FIG. 1) are transported through container twist track 54.

Figure 9:
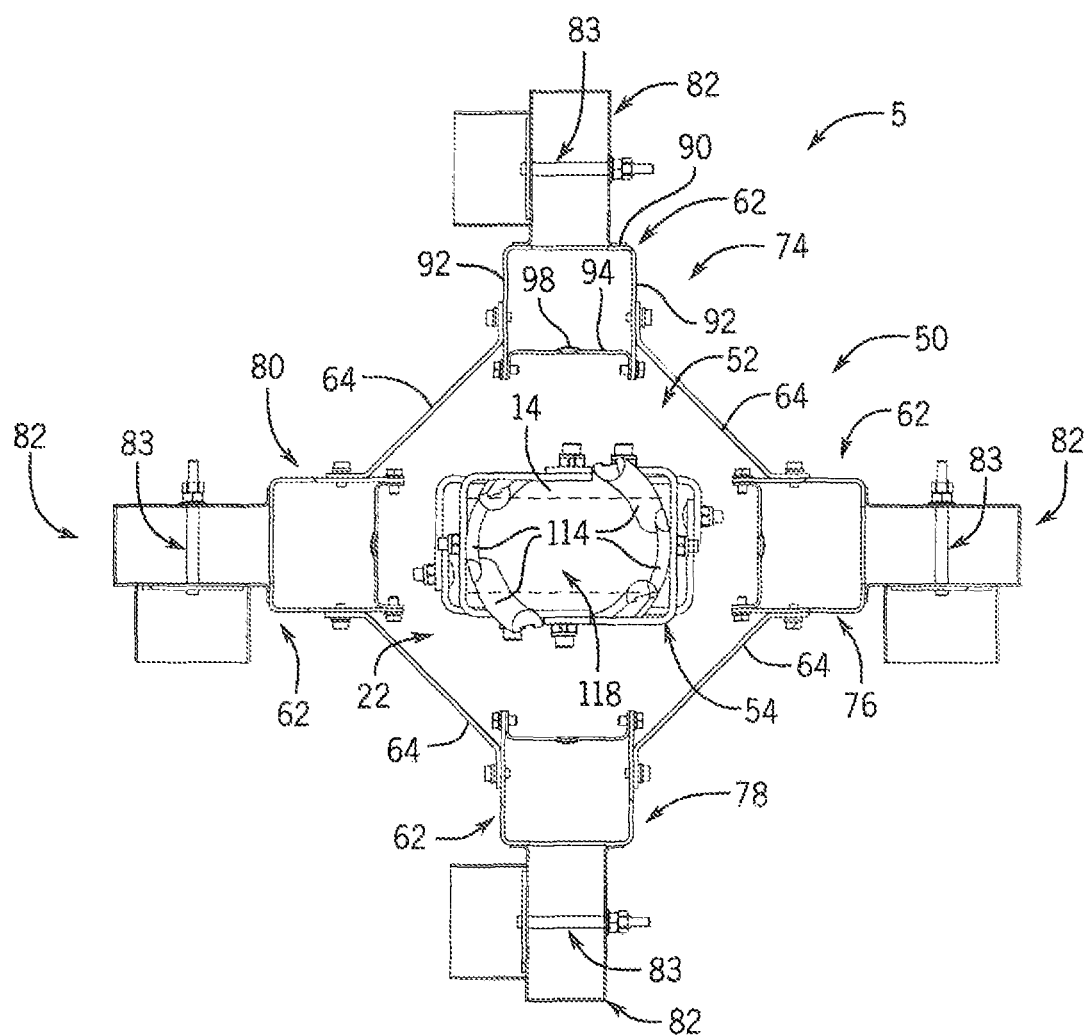
FIG. 9 is a transverse cross-sectional view of the air-driven container twisting system FIG. 1 taken at a first location.
Figure 10:
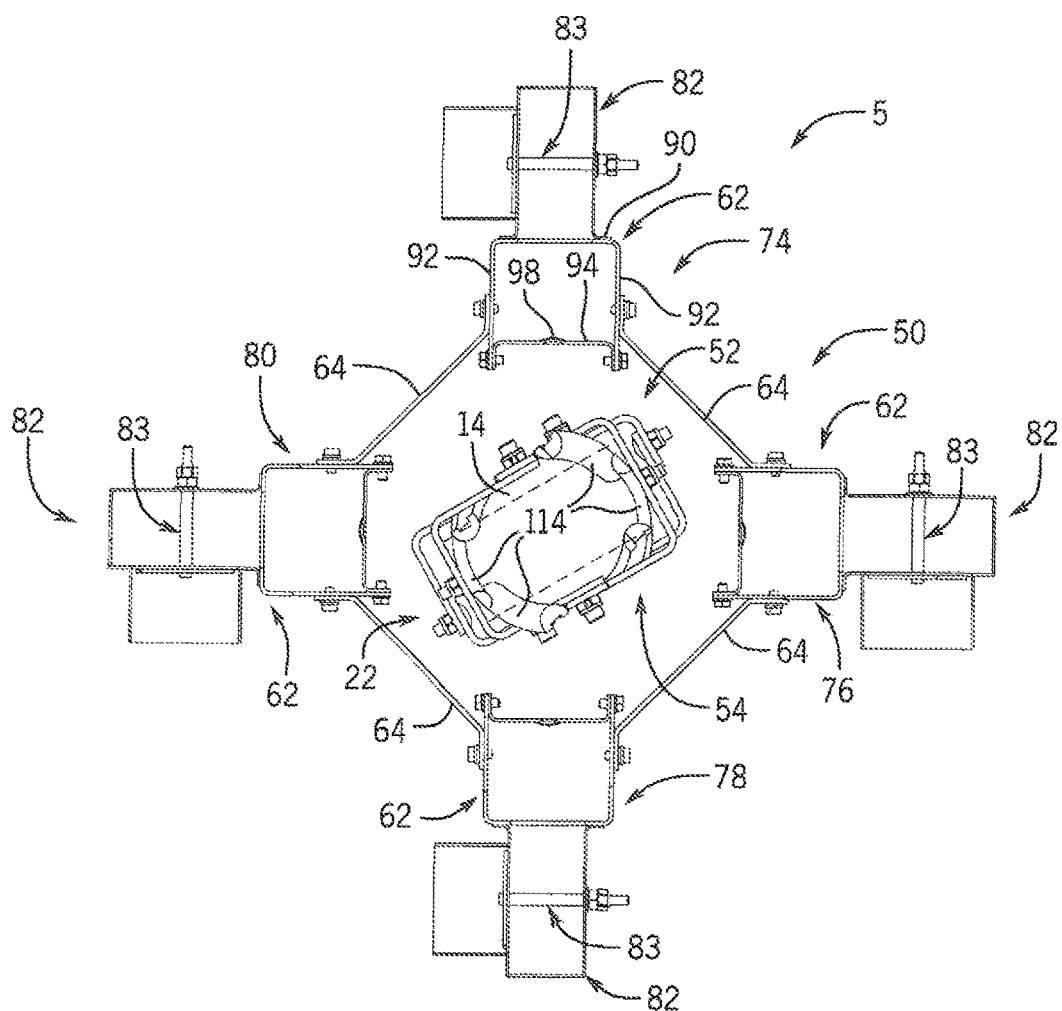
FIG. 10 is a transverse cross-sectional view of the air-driven container twisting system FIG. 1 taken at a second location.
Figure 11:
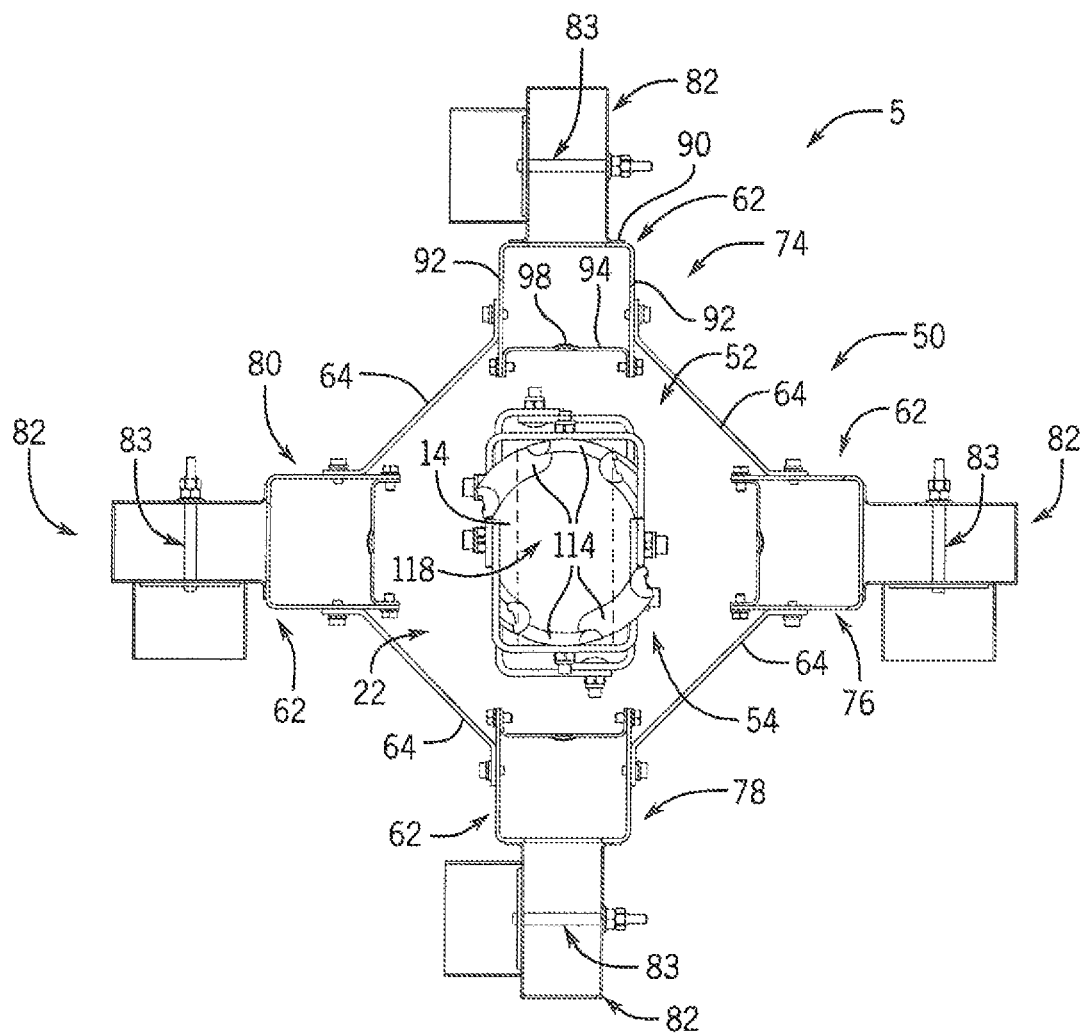
FIG. 11 is a transverse cross-sectional view of the air-driven container twisting system FIG. 1 taken at a third location.

Referring now to FIGS. 9-11, these cross-sections show orientation of a can 14 (shown in dashed-line) with passage 118 as directed by guide rails 114 at different positions along the length of twist track 54. FIG. 9 shows can 14 horizontal or sideways, corresponding to when can 14 enters airflow chamber 52 from inlet assembly 34 (FIG. 1). FIG. 10 shows can 14 tilted or angled at about 45° from horizontal and vertical horizontal or sideways, corresponding to when can 14 is at about a halfway point between inlet and outlet assemblies 34, 40 (FIG. 1). FIG. 11 shows can 14 vertical or upright, corresponding to when can 14 exits airflow chamber 52 and enters outlet assembly 40 (FIG. 1).

Referring again to FIG. 1, in operation of material-handling system 6 empty containers 12, such as cans 14, are transported via horizontal air conveyor 18 or another conventional can transport conveying equipment to the inlet end 30 of the air-driven container twisting system 5 in a horizontal position. Referring now to FIG. 4, the air louvers 98 of the inlet plenums 36 direct air in an upstream-to-downstream direction onto the top and bottom ends of the cans 14 (FIG. 1) to provide an initial push of air, moving the empty cans 14 (FIG. 1) into the upstream entrance of the container twist track 54. As the empty cans 14 (FIG. 1) enter into the passage 118 (FIG. 8) defined by the container twist track 54, air from the louvers 98 of top and bottom air plenums 74, 78, respectively, is discharged onto the rounded side surfaces of the cans 14 (FIG. 1). This functions to provide an air cushion between the guide rails 114 and the facing surfaces of the cans 14 so that the cans 14 essentially "float" between the guide rails 114 (FIGS. 3 and 8) as they are transported through airflow chamber 52 (FIG. 2) to prevent marring of the surfaces of cans 14 (FIG. 1) by engagement with the rails 114 (FIGS. 3 and 8). Referring again to FIG. 1, as the cans 14 move through the container twist track 54 (FIG. 2), container twist track 54 (FIG. 2) is operable to rotate the empty cans 14 moving through the air-driven container twisting system 5 to a vertical position. Referring now to FIG. 4, during such rotational movement of the cans 14 (FIG. 1) as they are advanced downstream, the top and bottom ends of each can 14 (FIG. 1) are rotated toward exposure to the air discharged from the louvers 98 of top and bottom air plenums 74, 78, respectively, and, referring to FIG. 5, away from exposure to the air discharged from the louvers 98 of right and left air plenums 76, 80, respectively. Similarly, the rounded sides of the cans 14 (FIG. 1) are rotated toward exposure to the air discharged from the louvers 98 of right and left air plenums 76, 80, respectively, and, referring to FIG. 4, away from exposure to the air discharged from louvers 98 of top and bottom air plenums 74, 78, respectively. Referring again to FIG. 1, in this manner, as the cans 14 are rotated during travel toward outlet end 32, the ends of the cans 14 are always exposed to air flow that acts on the ends of the cans 14 to advance the cans 14 downstream; first solely from the louvers 98 (FIG. 5) of right and left air plenums 76, 80 (FIG. 5), then from a combination of the louvers 98 (FIGS. 4 and 5) of right and left air plenums 76, 80 (FIG. 5) and top and bottom air plenums 74, 78 (FIG. 4), respectively, and finally solely from louvers 98 (FIG. 4) of top and bottom air plenums 74, 78 (FIG. 4). Likewise, the rounded side surfaces of cans 14 are constantly exposed to air flow that tends to maintain the air cushion between the can surfaces and the rails 114 (FIGS. 3 and 8); first solely from the louvers 98 (FIG. 4) of top and bottom air plenums 74, 78 (FIG. 4), respectively, then from a combination of the louvers 98 (FIGS. 4 and 5) of right and left air plenums 76, 80 (FIG. 5) and top and bottom air plenums 74, 78 (FIG. 4), respectively, and finally solely from louvers 98 (FIG. 5) of right and left air plenums 76, 80 (FIG. 5), respectively. As the empty cans 14 reach the outlet end 32 of the air-driven driven container twisting system 5 in the vertical position, the air louvers 98 (FIG. 4) of the top and bottom air plenums 74, 78 (FIG. 4) are configured to provide a final push of air, moving the empty cans 14 out of the twist track 54 (FIG. 2) of the air-driven container twisting system 5 and onto downstream container transport and handling equipment such as vertical air conveyor 20.

In the air-driven container twisting system 5 as shown in FIGS. 1-11 and described above, it can be appreciated that the orientation of cans 14 is altered between inlet end 30 and outlet end 32 without any change in elevation between inlet end 30 and outlet end 32. It is understood, however, that if desired the container twist track 54 may be positioned at an angle to discharge the cans 14 from outlet end 32 at a different elevation either higher or lower than inlet end 30. It can also be appreciated that the air plenums 36, 42, 74, 76, 78, 80 are relatively simple in construction, in that each is generally in the form of a straight-sided rectangular tube. The provision of four such plenums provides a significant amount of airflow, and the orientation of the plenums at every 90° about the container twist track 54 ensures that the cans 14 are always exposed to forces from the air pressure that simultaneously tend to advance the cans 14 downstream and provide a desired "float" of the cans 14 between the rails 114.

Figure 12:
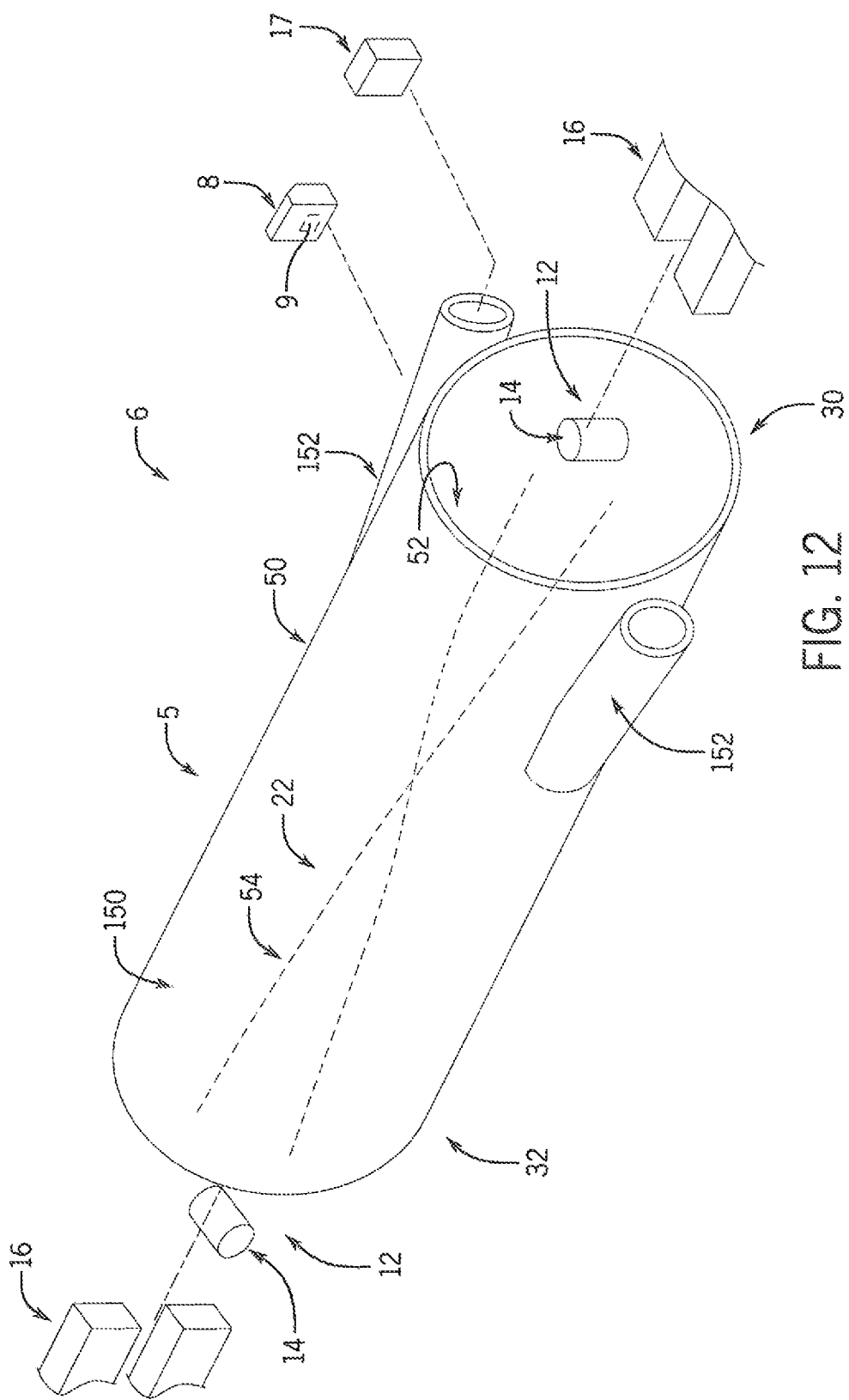
FIG. 12 is a pictorial view of a variant of an air-driven container twisting system in accordance with the present invention.

Referring now to FIG. 12, air-driven container twisting system 5 is substantially the same as that shown and described with respect to FIGS. 1-11, whereby the above descriptions apply here to the air-driven container twisting system 5 in FIG. 12. The air-driven container twisting system 5 of FIG. 12 differs from that shown and described with respect to FIGS. 1-11 in the following ways. Instead of a polygonal tubular structure of airflow chamber housing 50 that encloses airflow chamber 52, the airflow chamber housing 50 shown in FIG. 12 defines a tubular cylindrical body 120 as having an air cannon-type configuration, shown as an air tunnel 150 with a generally circular cross-sectional shape and that may be open at the inlet and outlet ends 30, 32. Instead of discrete plenums 62 (FIG. 2) that deliver flows of pressurized air into airflow chamber 52, the airflow chamber 52 of air tunnel 150 receives large volumes of pressurized flowing air through upper and lower air inlets 152 that are connected to the air tunnel 150 and supply pressurized air from pneumatic system 17 to the airflow chamber 52 in the interior of air tunnel 150. The upper and lower air inlets 152 are on opposite sides of air tunnel 150, with one of the air inlets 152 being located toward the bottom of the air tunnel 150 and the other being located toward the top of air tunnel 150. With this arrangement, when pressurized air is supplied to both the upper and lower air inlets 152, the pressurized air moves in an upstream-to-downstream direction with a swirling, cyclonic movement that supplies both axial downstream forces on the ends of the cans 14 to advance the cans in an upstream-to-downstream direction, and lateral forces on the side surfaces of the cans 14 that tend to cause the cans 14 to float between the rails 114 of container twist track 54.

Still referring to FIG. 12, the empty cans 14 are shown supplied to the inlet end 30 of the air air-driven container twisting system 5 in a vertical position. The air tunnel 150 is hollow and cylindrical in shape, and is configured to provide a tunnel for the container twist track 54. The container twist track 54 is configured to rotate the empty cans 14 moving through the air-driven container twisting system 5 to a horizontal position. Finally, as the empty cans 14 reach the outlet end 32 of the air-driven container twisting system 5 in the horizontal position, the empty cans 14 are moved out of the twist track 54 of the air-driven container twisting system 5.

Like the air-driven container twisting system 5 shown and described in FIGS. 1-11, with the air-driven container twisting system 5 shown in FIG. 12, it can be appreciated that the orientation of cans 14 is altered between inlet end 30 and outlet end 32 without any change in elevation between inlet end 30 and outlet end 32. It is understood, however, that if desired the container twist track 54 may be positioned at an angle to discharge the cans 14 from outlet end 32 at a different elevation than inlet end 30. It can also be appreciated that air tunnel 150 is relatively simple in its construction, and provides air movement and forces about the periphery of the container twist track 54 for advancing the cans 14 through the container twist track 54.

It is to be understood that the invention is not limited in its application to the details of construction and the arrangement of the components set forth in the description or illustrated in the drawings. The invention is capable of other embodiments, which can be practiced or carried out in various ways. Also, it is to be understood that the phraseology and terminology employed herein is for the purpose of description and should not be regarded as limiting.

We claim:

1. An air-driven article twisting system, comprising:
    an inlet end configured to receive articles into the air-driven article twisting system;
    an outlet end configured to deliver the articles out of the air-driven article twisting system;
    an airflow chamber housing arranged between the inlet and outlet ends;
    an airflow chamber arranged within the airflow chamber housing and configured to direct an airflow within the airflow chamber housing in an airflow direction from the inlet end to the outlet end of the air-driven article twisting system; and
    an article twist track that extends through the airflow chamber and is configured to direct the articles through the airflow chamber as driven by the airflow along a travel path that extends longitudinally and helically through the airflow chamber.

2. The system of claim 1, wherein the airflow chamber housing includes multiple air plenums that are spaced from each other about an outer perimeter of the airflow chamber housing with each of the multiple air plenums configured to direct an airflow into the airflow chamber.

3. The system of claim 2, further comprising multiple closure panels arranged between the multiple air plenums to provide alternating closure panels and air plenums of the airflow chamber housing.

4. The system of claim 2, wherein each of the multiple air plenums includes a perforated inner wall with openings that face toward the article twist track providing a defined flow direction.

5. The system of claim 2, further comprising inlet and outlet end plates respectively arranged at the inlet and outlet ends of the air-driven article twisting system and wherein at least one of the multiple air plenums is hinge connected to both the inlet and outlet plates to allow the respective air plenum to move between open and closed positions to correspondingly allow and restrict access into the airflow chamber.

6. The system of claim 2, further comprising an inlet assembly at the inlet end of the air-driven article twisting system with the inlet assembly having an inlet passage that defines an inlet passage width and wherein the airflow chamber defines an airflow chamber width that is wider than the inlet passage width.

7. The system of claim 6, wherein the inlet passage width is defined between a pair of inlet plenums at the inlet assembly and the airflow chamber width is defined between a pair of air plenums of the multiple air plenums arranged at opposite sides of the airflow chamber housing.

8. The system of claim 2, further comprising an outlet assembly at the outlet end of the air-driven article twisting system with the outlet assembly having an outlet passage that defines an outlet passage height and wherein the airflow chamber defines an airflow chamber height that is greater than the outlet passage height.

9. The system of claim 8, wherein the outlet passage height is defined between a pair of outlet plenums at the outlet assembly and the airflow chamber height is defined between a pair of air plenums of the multiple air plenums arranged at top and bottom portions of the airflow chamber housing.

10. The system of claim 1, wherein the airflow chamber housing defines a polygonal cross-sectional perimeter shape.

11. The system of claim 1, wherein the airflow chamber housing defines a circular cross-sectional perimeter shape.

12. An article transporting system, comprising:
    an article guide arrangement having an upstream end and a downstream end, wherein the article guide arrangement is configured to receive articles at the upstream end in a first orientation and to discharge articles at the downstream end in a second orientation;
    an air drive arrangement that extends along a majority of the length of the article guide arrangement, wherein the air drive arrangement is positioned about the article guide arrangement, and wherein the air drive arrangement discharges air toward the article guide arrangement for advancing the articles from the upstream end of the article guide arrangement toward the downstream end; and an enclosure that includes at least one wall that extends longitudinally with respect to and is arranged outwardly of the air drive arrangement, wherein the enclosure defines an outer boundary of the air drive arrangement.

13. The system of claim 12, wherein the article guide arrangement comprises an article twist track that includes a series of helical rails.

14. An article transporting system, comprising:

an article guide arrangement having an upstream end and a downstream end, wherein the article guide arrangement is configured to receive articles at the upstream end in a first orientation and to discharge articles at the downstream end in a second orientation; and an air drive arrangement that extends along a majority of the length of the article guide arrangement, wherein the air drive arrangement is positioned about the article guide arrangement, and wherein the air drive arrangement discharges air toward the article guide arrangement for advancing the articles from the upstream end of the article guide arrangement toward the downstream end;

wherein the article guide arrangement comprises an article twist track that includes a series of helical rails; and wherein the article twist track and the air drive arrangement are configured to direct air onto a pair of opposite end surfaces of each of the articles to advance each of the articles in a downstream direction and onto side surfaces of each of the articles to provide an air cushion between the side surfaces of each of the articles and the rails.

15. The system of claim 14, wherein the air drive arrangement comprises a plurality of generally tubular air plenums.

16. The system of claim 14, wherein the air drive arrangement comprises an air tube defining a tunnel through which the article twist track extends.

* * * * *